June 7, 1927. 1,631,208

B. JEROME

INTERNAL COMBUSTION ENGINE

Original Filed Feb. 9, 1924  2 Sheets-Sheet 1

Inventor
Benjamin Jerome
By his Attorney
Blackmore, Spencer & Hub.

June 7, 1927.

B. JEROME 1,631,208

INTERNAL COMBUSTION ENGINE

Original Filed Feb. 9, 1924   2 Sheets-Sheet 2

Inventor
Benjamin Jerome
By his Attorneys
Blackmore, Spencer & Fluit

Patented June 7, 1927.

1,631,208

UNITED STATES PATENT OFFICE.

BENJAMIN JEROME, OF PONTIAC, MICHIGAN, ASSIGNOR TO GENERAL MOTORS CORPORATION, OF DETROIT, MICHIGAN, A CORPORATION OF DELAWARE.

INTERNAL-COMBUSTION ENGINE.

Application filed February 9, 1924, Serial No. 691,669. Renewed November 14, 1925.

This invention relates to internal combustion engines, and has for an object the provision of a compact and efficient arrangement of parts which will reduce to a minimum the number of exteriorly-mounted shafts and accessory devices.

Having this object in view, the intake manifold is arranged to leave unobstructed a space at the center of the engine, where one of the branches of the manifold is usually located, in which space is arranged a power-driven shaft driving an accessory device at each end. In an arrangement which is especially desirable for six cylinder engines, the manifold has four branches instead of the usual three, this making possible the above-described arrangement in that each end branch may be arranged to communicate with two end cylinders, while each of the middle branches communicates with one of the middle cylinders directly, so that the space between the two middle cylinders is entirely unobstructed. In the arrangement shown in the drawings, the lower end of the shaft drives the oil pump while the upper end drives the distributer.

The above and other objects and features of the invention, including various novel combinations of parts and desirable particular constructions, will be apparent from the following description of one illustrative embodiment shown in the accompanying drawings, in which Fig. 1 is a side elevation, partly broken away, of the engine of an Oakland automobile;

Figure 1:
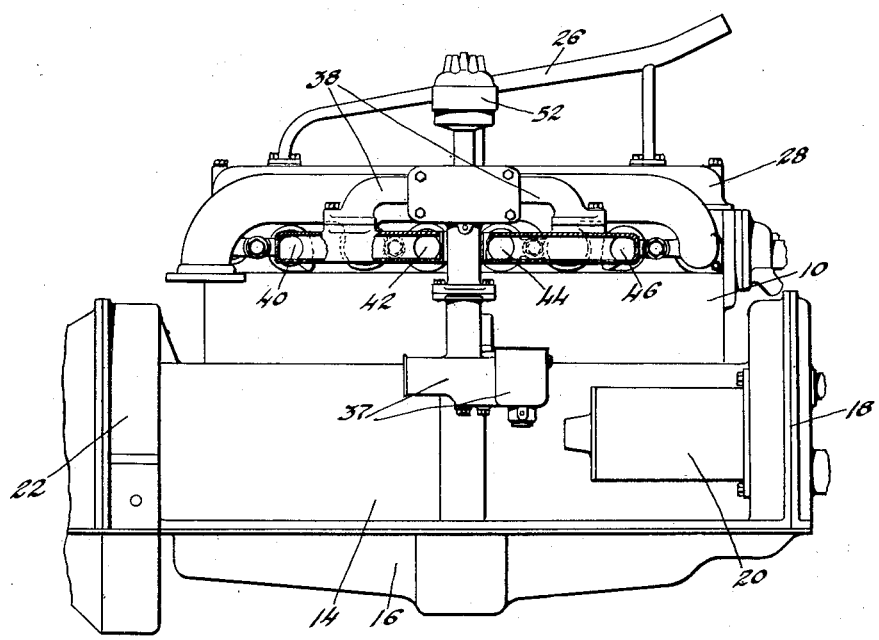

In the first arrangement selected for illustration, the invention is embodied in an engine having a block 10 of six cylinders 12, a crankcase 14 and oil pan 16, timing gear case 18, generator 20, and flywheel housing 22. A breather tube is shown at 24, and water connections at 26. The cylinder head 28 is formed with a "slipper type" combustion chamber 30 for each cylinder 12; that is, each combustion chamber 30 is thinned down opposite the valve side to form the "toe" 32 of the "slipper." The valves 34 are inclined slightly, about 4 degrees, from the vertical, and the spark plugs 36 are arranged at the highest point in the combustion chambers.

According to the present invention, combustible mixture is supplied to the cylinders from a carbureter 37 through an intake manifold having an upper portion with a pair of branches 38 which communicate with a lower portion with four branches 40, 42, 44, and 46. Each of the branches 40 and 46 communicates with two of the cylinders 12, and each of the branches 42 and 44 communicates with one cylinder 12 only, the passage 48 into which branch 44 opens being shown in Fig. 2. By using this type of manifold, instead of the usual manifold having three branches each of which communicates with two cylinders, there is a vertical unobstructed space opposite the center of the cylinder block, between the manifold and the cylinder block and extending between the branches 42 and 44. Immediately above this space the cylinder head 28 is provided with a boss 49 supporting a distributer 52 held by a clamp plate 51 bolted to the cylinder head and driven by a shaft 54 having a protective sleeve 50.

The shaft 54 is driven by a central shaft 56 supported by a bushing 58 and having keyed to its lower end a worm wheel 60 meshing with a worm on the camshaft 62. The shaft 56 also drives an alined shaft 64 in the crankcase, which shaft drives an oil pump 66, shown as a gear pump, which delivers oil through conduits 68 to the bearings of the crankshaft 70 and camshaft 62, and to other parts requiring lubrication. It will be noted that this mounting of the parts brings distributer 52 into a central, accessible position where it is away from the dirt and oil which collect around the crankcase, and that it leaves the opposite side of the engine clear. I prefer to take advantage of this to mount on the opposite side of the engine a bracket carrying the coil 72 on its upper side and the horn 74 on its lower side.

Figure 2:
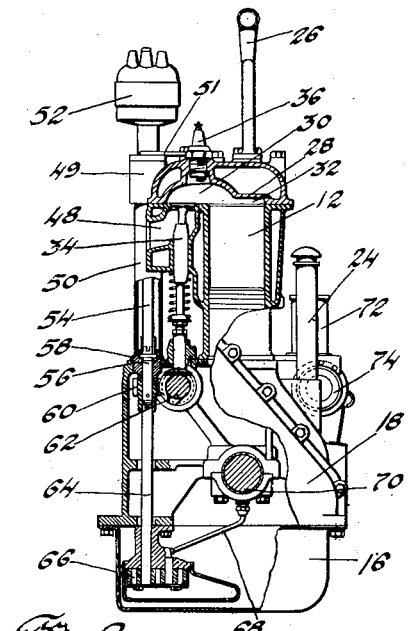
Fig. 2 is a front elevation, partly broken away, of the same engine.
Figure 3:
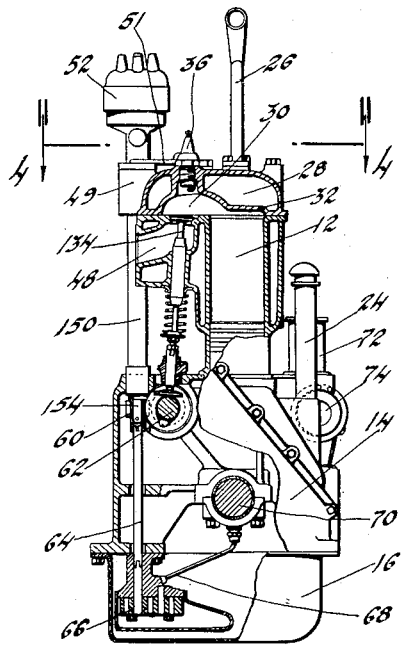
Fig. 3 is a view corresponding to Fig. 2, but showing a modified form.
Figure 4:
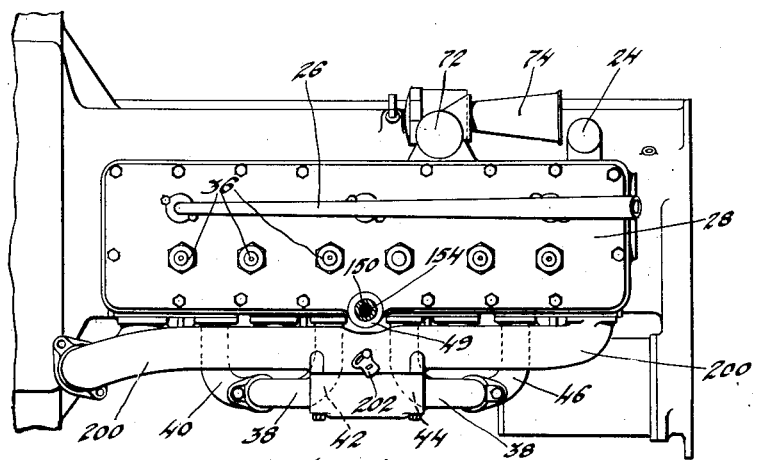
Fig. 4 is a top plan view, with the distributer drive shaft in section on the line 4—4 of Fig. 3, of the modification shown in Fig. 3.

In the modification shown in Figs. 3 and 4, the inclination of the valves 134 is shown as being slightly greater than that of valves 34 in Fig. 2, and the sleeve 150 of distributer shaft 154 projects into the crankcase at its lower end, to take the place of bushing 58. The distributer drive shaft 154 carries the worm wheel 60 directly, thus omitting the separate drive shaft 56 of Fig. 2, and the pump shaft 64 is driven directly from shaft 150. The exhaust manifold is shown at 200, it being provided with a damper valve 202 controlling diversion of exhaust gases to a jacket around part of the intake manifold.

While two embodiments of my invention have been described in detail, it is not my intention to limit its scope to those embodiments, or otherwise than by the terms of the appended claims.

I claim:

1. An internal combustion engine comprising a block formed to provide a plurality of cylinders, ports in the block communicating with the cylinders, a branched manifold communicating with the ports and arranged to provide an open space defined by the block and the branches of the manifold, a power driven shaft extending through said space, and an accessory device driven from said shaft.

2. The structure as defined by claim 1, said cylinder block being provided with a head having an outwardly projecting boss, said boss being apertured for the passage of the shaft and serving to guide the latter.

3. An internal combustion engine comprising a block formed to provide a plurality of cylinders, intake and exhaust ports in the block communicating with the cylinders and opening on one side of the block, a branched intake manifold communicating with the intake ports and a branched exhaust manifold communicating with the exhaust ports, said manifolds being arranged to provide an open space defined by the branches of the manifolds and the cylinder block, a power driven shaft extending upwardly through said space, and an auxiliary device mounted upon the upper end of the shaft.

4. The structure as defined by claim 3, said engine being provided with the customary crankcase into which the lower end of said shaft extends, and an oil pump in the crankcase driven by said shaft.

5. An internal combustion engine having a crankcase, a plurality of cylinders mounted on the crankcase, a cam shaft in the crankcase, a substantially vertical shaft extending upwardly along the cylinders, means for driving the vertical shaft from the cam shaft, a distributor detachably mounted on the upper end of the vertical shaft, an oil pump in the crankcase and a detachable shaft section extending from the vertical shaft to the oil pump for driving the latter.

6. An internal combustion engine having a plurality of cylinders provided with intake and exhaust ports, said ports being arranged in groups with a space therebetween, branched intake and exhaust manifolds communicating with said ports and arranged to provide an open space defined by the branches of said manifolds and the adjacent cylinder walls, a power driven shaft extending through said space, and an auxiliary device driven from the upper end of said shaft.

7. A motor comprising a crank casing, a motor block thereon, the block being provided with a plurality of cylinders, a vertically disposed shaft located at one side of the cylinders, between the ends of and extending above the block, at its lower end projecting within the crank case and an accessory device driven by the upper end of the vertical shaft.

8. A motor comprising a crank case, a motor block thereon, the block provided with a plurality of cylinders, a vertically disposed shaft located between the ends of the block and extending within the crank case, driving mechanism therefor within the crank case, a distributor at the upper end of the shaft whereby the leads for the several cylinders may be short and conveniently located.

9. A combination as defined in claim 8, together with an oil pump located within the crank and driven by the vertical shaft.

10. An explosive motor having a plurality of cylinders arranged in line, valve mechanism, and fuel inlet and exhaust mechanism on one side of the motor, a vertical shaft between the ends of the motor on the same side as the valve mechanism, an accessory device driven thereby at a point above the motor, the construction defined rendering the other side of the motor substantially free from obstruction.

11. An internal combustion engine and a drive shaft, and a plurality of cylinders arranged in line, an accessory drive shaft operably connected with the main drive shaft and extending from within the crank case upwardly along the side of the cylinders, an accessory mounted upon the upper end of said shaft and driven therefrom, and means at the upper portion of said engine affording a bearing for said accessory drive shaft.

12. The combination set forth in claim 11 wherein said shaft extends substantially mid-way between two adjacent cylinders.

13. A combination of elements as set forth in claim 11, said cylinders being provided with a removable head, said last named means being carried by said head.

14. The combination of an L-head engine comprising the usual crank case, a crank shaft in the crank case and cylinders mounted on the crank case and arranged in line, said engine having valve mechanism and fuel supply and exhaust conduits arranged on one side of said cylinders, an accessory drive shaft driven from said crank shaft, and an accessory device driven from the upper portion of said shaft, said shaft extending upwardly along side of said cylinders on the same side thereof as said valve mechanism, whereby the other side of said engine is substantially unobstructed, said crank case being provided with an oil filling device on the unobstructed side of the engine.

In testimony whereof I affix my signature.

BENJAMIN JEROME.